J. C. FRENCH.
TRACTOR TRACK.
APPLICATION FILED AUG. 19, 1918.
1,306,178.
Patented June 10, 1919.
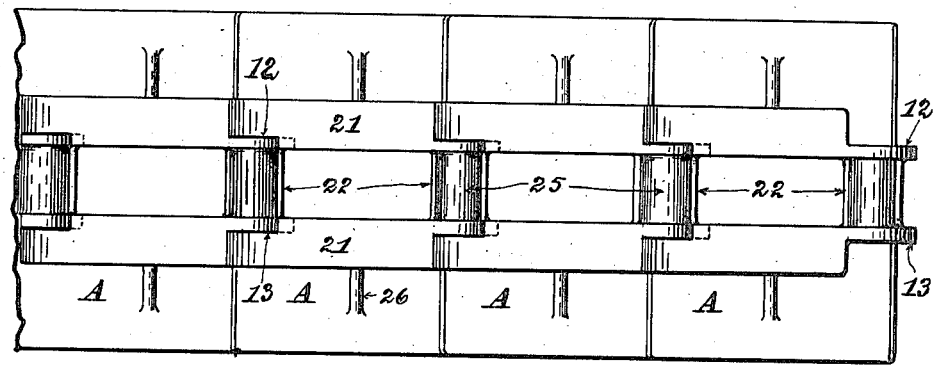
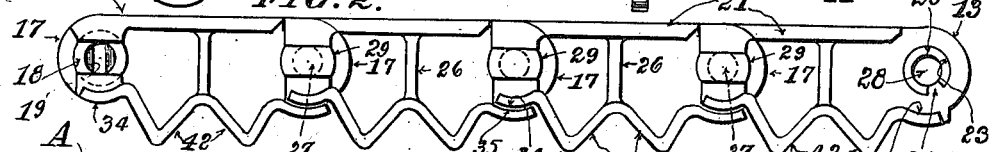
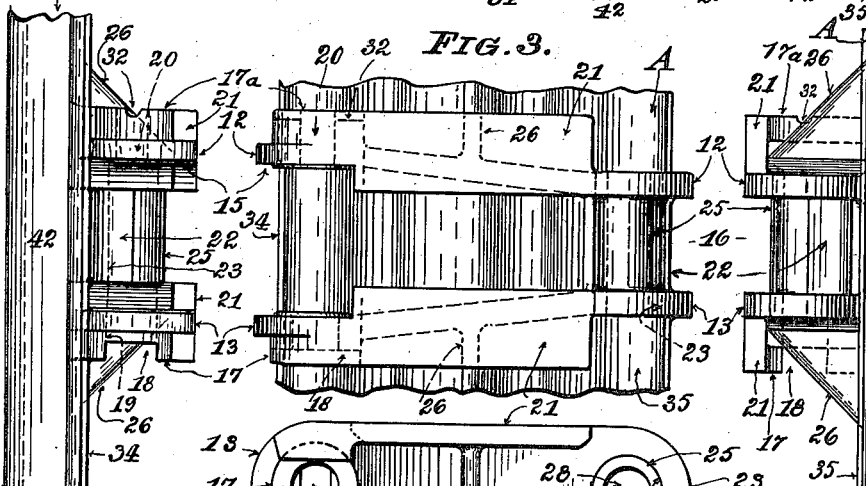
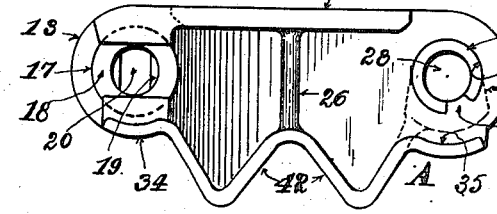
WITNESSES:
INVENTOR:
JAMES C. FRENCH,
BY
ATTORNEYS.

UNITED STATES PATENT OFFICE.

JAMES C. FRENCH, OF CHICAGO, ILLINOIS, ASSIGNOR TO FREDERICK C. AUSTIN, OF CHICAGO, ILLINOIS.

TRACTOR-TRACK.

1,306,178.　　　　　Specification of Letters Patent.　　Patented June 10, 1919.

Application filed August 19, 1918.　Serial No. 250,537.

*To all whom it may concern:*

Be it known that I, JAMES C. FRENCH, a citizen of the United States, and a resident of the city of Chicago, in the county of Cook and State of Illinois, have invented a certain new and useful Improvement in Tractor-Tracks; and I do hereby declare that the following description of my said invention, taken in connection with the accompanying sheet of drawing, forms a full, clear, and exact specification, which will enable others skilled in the art to which it appertains to make and use the same.

My invention relates generally to improvements in tractor tracks; and it consists, essentially, in the novel and peculiar combination of parts and details of construction, as hereinafter first fully set forth and described and then pointed out in the claims.

The object of this invention is the production of an efficient, serviceable, and very durable self-laying track for traction engines in which the liability to wear, and breakage, shall be reduced to a minimum, and hence, its wearing qualities considerably enhanced.

To attain these desirable objects, I construct this endless track, in the preferred embodiment of my invention, as shown in the drawings forming a part of this specification, and in which—

Figure 1 is a plan of a fragment of the endless track constructed in accordance with my invention. Fig. 2 is a side elevation of the same. Fig. 3 is a plan of one of the links and treads detached, the figure being drawn on an increased scale. Fig. 4 is a side elevation of the same. Fig. 5 is an end elevation of the male end of this device; and Fig. 6 is a like view of the female end thereof. Fig. 7 is a plan of the link, or pivot-bolt used in this construction; and Fig. 8 is an end view of the same.

Like parts are designated by the same characters and symbols of reference in all the various figures.

This endless track band or belt comprises a multiplicity of articulated shoes or treads, each one of which is formed with the required track on which a traction engine is constructed to run. This shoe or tread A, consists of a plate which is transversely corrugated to resemble the letter W when looked at from the sides of the shoe, as indicated at 42. One of the transverse edges of this tread is convex on its lower surface, as indicated at 34; and the other opposing edge thereof is concave on its upper surface, as illustrated at 35, which latter edge underlies the convex margin, whereby the joints of adjacent treads are practically closed so as to prevent entrance of stones, grit, or other objectionable matter between these treads; and these concavo-convex surfaces, having their centers in the center of the pivot bolt 27, permit of an oscillatory movement of the shoes when they are passing over the usual driving sprocket wheels of the tractor.

Rising from this tread-plate, at equal distance from the longitudinal center line thereof, there are two walls or webs, 12, 13, which walls are in parallel spaced relationship at both ends, the parallel portions at one end of the walls being spaced farther apart than those at the other end, thereby forming, as it were, the female portion of a link, while the opposite ends of said webs form the male part of the same, the ends 12, 13, of the male part being connected by a bridge 22, the upper surface of which is semicircularly concaved, the webs 12, 13, diverging from this male end to the female end thereof, as indicated in dotted lines in Fig. 3. At the female ends of the webs 12, 13, there are outwardly extending tubular bosses 17, 17ᵃ, of which the boss 17 has a recess 18, in its face, the bore in this boss being round, while the bore 20 in the boss 17ᵃ is oblong in contour, the object of which will hereinafter fully appear.

Laterally extending from the upper margins of the webs 12, 13, there are horizontally-disposed plates 21, which form the track-surfaces of the endless track bands, and which, in the present instance, are quite wide, so as to afford a wide running surface for the track wheels of a traction engine.

The male ends of the link have a substantially round bore 23, into which extends a preferably V-shaped projection 24. This bore 23 is bushed with a split bushing 25, extending from the outside of one wall to the outside of the other wall, the split in the bushing engaging said projection 24, and, thereby, prevents the bushing from rotation in said bore 23. This bushing is supported by the said bridge 22, in which it is partly embedded; and it is, preferably, a manganese steel casting, which metal is so hard that machining thereof is practically impossible; and its wearing qualities are, therefore, the very best obtainable.

From the outsides of the webs 12, 13, approximately medially of their length, extend braces 26, which connect the webs to the tread plates, and thereby reinforce these webs and prevent the track-rails 21 from spreading, which is a very desirable feature of this construction.

A multiplicity of the treads with their rails are connected to each other by a bolt 27, which fits the bore 19 in the boss 17, and the bore 28 in the bushing, by an easy sliding fit. This bolt 27 has a flat head 29, which engages the recess 18 in the face of the boss 17; and it terminates in a flattened portion 30, which engages the oblong bore 20 in the boss 17$^a$. This flattened head, and the flattened portion of the bolt, prevent the latter from rotation, so that the rotation or oscillation of the links is entirely confined to the hole in the bushing. This bolt is likewise formed of manganese steel in the process of casting; and in order to retain the bolt in assembled position, a hole 31, is cast therein, (drilling of this hole being impractical) to receive a cotter pin, not shown, which cotter pin is partly embedded in a groove 32, in the face of the boss 17$^a$.

Attention is now directed to the fact that the bushing 25 and the coacting bolt 27, being made from manganese steel, are practically indestructible, there being no appreciable wear to these parts even when devoid of lubrication and when subjected to the action of grit, sand, and other abrasive matter entering the joints; lubrication of these joints being useless, owing to the peculiar conditions of use of the machine on which such endless track bands are employed. Attention is, furthermore, directed to the fact that approximately the upper half of this bushing is exposed, so that the teeth of the driving sprocket bear directly upon this bushing, while the lower half of this bushing is embedded in the bridge, and thereby securely held in position. In prior constructions, the male parts of the link are constructed and connected by a tubular hub, and the sprocket teeth bear upon this tubular hub which, being a casting of a rather soft metal, rapidly wears out and necessitates the scrapping of the entire shoe, a drawback which is entirely overcome by the construction hereinbefore described. And if for any reason whatever, the bushing requires removal it can be readily withdrawn from the belt-member and a new one applied.

The shoe or tread with its webs, track-flanges and braces is entirely formed integral in the process of casting in a mild grade of steel or malleable iron, and as constructed, requires no manual, or machine, labor to prepare the part for assembling, which latter operation may be performed by any kind of cheap labor.

The treads of the endless track bands are exceedingly wide, so that it is practically impossible to mire a tractor when working in wet or boggy soil; the formation of the tread-plates in the latter case, (being in fact a double V) prevents the slipping of the track bands by embedding themselves in the soil.

I have hereinbefore described with considerable minuteness the preferred embodiment of my invention; but I desire it to be understood that I am aware that changes may be made therein, and parts omitted without departing from the scope of my invention as defined in the appended claims.

Having thus fully described this invention, I claim as new, and desire to secure to myself by Letters Patent of the United States—

1. In a track band for traction engines, a multiplicity of articulated members, each member consisting of a tread-plate, said tread-plate being of double V formation, there being on said plate spaced apart walls, said walls being parallel at both ends, one adjacent pair of said walls affording the female member of a link, the other two adjacent ends forming the male part of said link, the latter ends of said walls being connected by a bridge, the upper surface of said bridge being semicircularly grooved, the bores in said ends being substantially round, there being in said bores an inwardly extending projection, a split bushing in said bores, the split in said bushing engaging said inwardly extending projection, said bushing having its upper half exposed between said walls and its lower half embedded in said bridge, said walls diverging from the male end to the female end between said parallel ends, a bolt connecting adjacent track members, said bolt being non-rotating, said bolt and said bushing being constructed of manganese steel.

2. A band member for endless track bands, comprising a tread-plate, said tread-plate being of W-shaped formation, there being on said plate vertically-disposed walls, braces connecting said walls to said tread-plates, said walls having parallel-spaced ends, one adjacent pair of said walls affording the female member of a link, the other two adjacent ends forming the male part of said link, the latter ends of said walls being connected by a bridge, the bore of these ends being substantially round, there being in said bores inwardly extending projections, a split bushing in said bores, the split in said bushing engaging said inwardly extending projections, said walls diverging from the male end to the female part of said walls, there being formed at the female ends of said walls punctured bosses, one of said bosses having a circular bore, the face of said boss being provided with a recess, the other of said bosses having an oblong bore, adjacent members of said band being connected by a bolt, said bolt having a flat head engaging said recess, and a flattened end engaging said oblong bore.

In testimony that I claim the foregoing as my invention, I have hereunto set my hand.

JAMES C. FRENCH.